United States Patent
Berke et al.

(10) Patent No.: US 9,531,569 B2
(45) Date of Patent: Dec. 27, 2016

(54) POWER AWARE RECEIVER/TRANSMITTER ADAPTATION FOR HIGH SPEED SERIAL INTERFACES

(71) Applicant: Dell Products, LP, Round Rock, TX (US)

(72) Inventors: Stuart Allen Berke, Austin, TX (US); Bhyrav M. Mutnury, Round Rock, TX (US); Minchuan Wang, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 85 days.

(21) Appl. No.: 14/509,653

(22) Filed: Oct. 8, 2014

(65) Prior Publication Data

US 2016/0105296 A1   Apr. 14, 2016

(51) Int. Cl.
| | |
|---|---|
| G06F 1/00 | (2006.01) |
| H03H 7/30 | (2006.01) |
| H03H 7/40 | (2006.01) |
| H04L 25/03 | (2006.01) |
| H04L 1/00 | (2006.01) |

(52) U.S. Cl.
CPC ....... *H04L 25/03057* (2013.01); *H04L 1/0036* (2013.01); *H04L 2025/03681* (2013.01)

(58) Field of Classification Search
CPC .................................................. G06F 1/3203
USPC .......................................................... 713/300
See application file for complete search history.

(56) References Cited

U.S. PATENT DOCUMENTS

| | | | | |
|---|---|---|---|---|
| 4,571,733 | A  * | 2/1986 | Kaku et al. | 375/231 |
| 4,694,469 | A  * | 9/1987 | Kaku et al. | 375/231 |
| 7,562,108 | B2 * | 7/2009 | Singh et al. | 708/819 |
| 7,613,238 | B2 * | 11/2009 | Chang | 375/233 |
| 8,041,226 | B2 * | 10/2011 | Kato | 398/136 |
| 8,422,543 | B2 * | 4/2013 | Nguyen et al. | 375/229 |
| 8,654,898 | B2 | 2/2014 | Bereza et al. | |
| 9,041,447 | B2 * | 5/2015 | Hwang | 327/172 |
| 2010/0246657 | A1 | 9/2010 | Ou | |
| 2013/0051153 | A1 | 2/2013 | Tailliet et al. | |
| 2013/0301695 | A1 | 11/2013 | Nishi | |

\* cited by examiner

*Primary Examiner* — Suresh Suryawanshi
(74) *Attorney, Agent, or Firm* — Larson Newman, LLP

(57) ABSTRACT

A receiver includes first and second equalization modules adapted to provide first and second compensations to a data signal, and a control module including a list that identifies the first equalization module as being less efficient than the second. The control module provides first and second compensation levels of the first and second compensations, such that the first and second compensations operate on the data signal to meet a bit error rate (BER) target, lowers the first compensation to reduce the power consumption of the receiver based on the list, and determines whether, in response to an increase in the level of the second compensation the BER target is met.

20 Claims, 4 Drawing Sheets

POWER AWARE RECEIVER/TRANSMITTER ADAPTATION FOR HIGH SPEED SERIAL INTERFACES

FIELD OF THE DISCLOSURE

This disclosure generally relates to information handling systems, and more particularly relates to link equalization in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-efforts basis, where settings that result in a "good enough" compensation solution are quickly obtained, in favor of iterative processes that might yield a more optimal solution, but which require an inordinate amount of time for such link training. Additionally, as speed increases, the power consumed in an information handling system is increasingly dominated by I/O power consumption.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
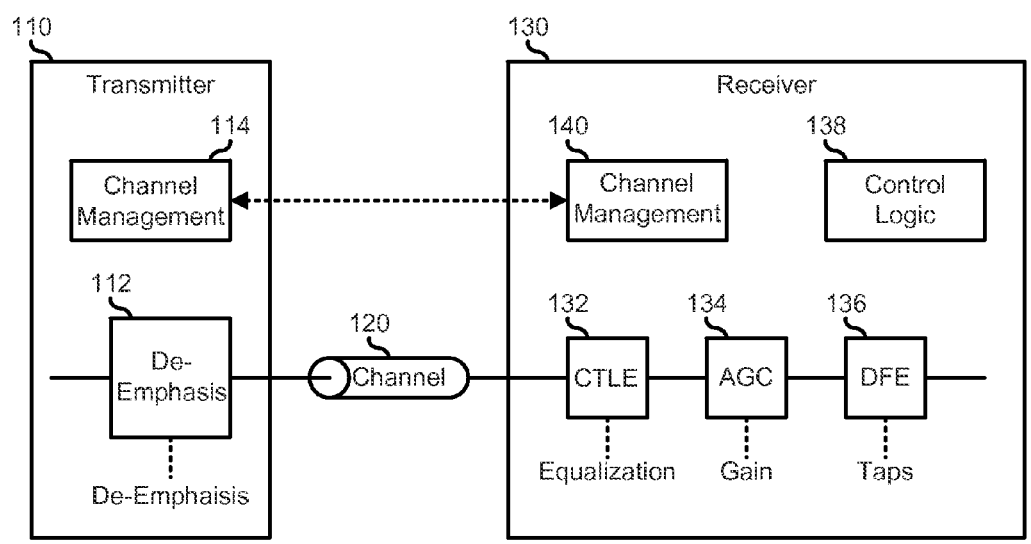
FIG. 1 illustrates a high speed serial interface according to an embodiment of the present disclosure.

FIG. 1 illustrates an embodiment of a high speed serial channel 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter (TX) 110, a transmission channel 120, and a receiver (RX) 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates to provide back channel adaptation where transmitter 110 and receiver 130 communicate with each other to optimize and adjust various compensation values within the transmitter and the receiver to compensate for the insertion loss of transmission channel 120. A determination is made as to whether or not a set of compensation values is satisfactory based upon a determination of the bit error rate (BER) associated with the set of values. It is possible for multiple different sets of compensation values to result in acceptable BER in serial channel 100. Thus, when a particular set of compensation values is obtained through the back channel adaptation, serial channel 100 further operates to adjust the particular set of compensation values to lower the settings of compensation mechanisms that are known to consume a greater amount of power, and to adjust other mechanisms to correct for the lowered settings, thereby reducing the power consumption of serial channel 100, while maintaining an acceptable BER.

Transmitter 110 includes a de-emphasis module 112 and a channel management module 114. In operation, serial data is provided to de-emphasis module 112, and the de-emphasis module operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. Channel management module 114 will be described below.

Receiver 130 includes equalization modules having a continuous time linear equalization (CTLE) module 132, an automatic gain control (AGC) module 134, a decision feedback equalization (DFE) module 136, a control logic module 138, and a channel management module 140. In operation, the de-emphasized serial data is received by CTLE module 132, and the CTLE module operates to provide compensation for inter-signal interference (ISI) in order to open the signal eye of the received signal. The amount of compensation is determined based upon an equalization setting. For example, receiver 130 can support 21 equalization settings, or levels, which each prescribe a different amount of equalization, from 0 dB to 10 dB, in 0.5 dB steps. Other numbers of settings and amounts of equalization prescribed by the equalization setting can be utilized, as needed or desired.

The equalized signal is provided from CTLE module 132 to AGC module 134. AGC module 134 operates to provide a linear gain compensation to the signal received from CTLE module 132 to further open the signal eye of the received signal. The amount of gain is determined by a gain setting, and can support 21 gain settings, or levels, which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 132 to DFE module 136. DFE module 132 operates to provide feedback based compensation to the received signal. The amount of compensation is determined by enabling a number of circuit feedback taps, or levels. For example, DFE module 136 can support up to 16 taps that provide compensation based upon up to 16 previous data points. In a particular embodiment, DFE module 136 can be turned off, thereby reducing the power consumed by receiver 130. In another embodiment, one or more tap of DFE module 136 can be turned on based upon the taps setting, while the rest of the taps are placed into a tri-state condition, that is, with power applied, but with the taps not providing feedback to the resultant DFE compensation. In yet another embodiment, one or more tap of DFE module 136 can be turned on based upon the taps setting, while the rest of the taps are turned off, thereby reducing the power consumed by receiver 130. Other numbers of taps can be utilized, as needed or desired.

In operation, serial channel 100 provides power aware backchannel adaptation to determine a set of compensation values that provides a satisfactory BER and also provides reduced power consumption. Here, an initial set of compensation values can be determined based upon a best-effort channel adaptation algorithm to provide a baseline set of compensation values. Then control logic module 138 operates to optimize the power consumption by turning off or reducing the settings of one or more of the highest power consuming compensation mechanisms, and then re-determining the set of compensation values with the reduced settings for the highest power consuming compensation mechanisms. In the embodiment where one of the highest power consuming compensation mechanisms is turned off, control logic module 138 determines if the other compensation mechanisms provide sufficient compensation to maintain the satisfactory BER. If not, then the highest power consuming compensation mechanism is turned back on, but with a lower setting than was previously utilized, and control logic module 138 again re-determines the set of compensation values. In the embodiment where the setting of one of the highest power consuming compensation mechanisms is reduced, the setting is reduced incrementally and control logic module 138 again re-determines the set of compensation values, and the cycle can continue until the process yields an unsatisfactory BER. At that point, the previous set of compensation values that yielded the satisfactory BER is employed as the resulting compensation values. In a particular embodiment, the power aware backchannel adaptation is performed in both transmitter 110 and receiver 130. Here channel management module 140 communicates with channel management module 114 to reduce the de-emphasis settings of de-emphasis module 112, and control logic module 138 performs the iterative process as describe above, in order to reduce the power consumed by both the transmitter and the receiver. In another embodiment, only receiver 130 operates to provide the power aware backchannel adaptation.

TABLE 1

| | Power Efficiency | |
|---|---|---|
| | Power Efficiency at 10 Gb/s (mW/Gb/s) | Power Efficiency at 20 Gb/s (mW/Gb/s) |
| TX De-Emphasis (1-5 taps) | 3.5-5.0 | 6.5-8.5 |
| RX DFE (1-5 taps) | 0.5-1.0 | 0.4-0.9 |

TABLE 1-continued

Power Efficiency

| | Power Efficiency at 10 Gb/s (mW/Gb/s) | Power Efficiency at 20 Gb/s (mW/Gb/s) |
|---|---|---|
| RX CTLE (3-12 dB) | 0.1-0.2 | 0.12-1.0 |
| RX Gain (3-12 dB) | 0.1-0.15 | 0.1-2.0 |

In a particular embodiment, the power efficiency of the various compensation mechanisms of serial channel 100 at the various setting levels is determined, and the compensation mechanisms are ranked in order from the least efficient to the most efficient. Table 1 illustrates exemplary efficiencies of de-emphasis module 112, CTLE module 132, AGC module 134, and DFE module 136. Here, the highest power consumption is provided by de-emphasis module 112, the next highest power consumption is provided by DFE module 136, the next highest power consumption is provided by CTLE module 132, and the lowest power consumption is provided by AGC module 134. The power efficiency of the various compensation mechanisms can be determined based upon power characterizations of transmitter 110 and receiver 130, and the ranking, such as the ranking of Table 1, can be programmed into the receiver, such that an ordered priority of compensation mechanisms can be used to intelligently adjust the power consumption of serial channel 100. For example, control logic module 138 can include a table similar to Table 1, or can include a table with more or less entries, as needed or desired. In a particular embodiment, control logic module 138 includes lists, each being associated with a different data transfer rate, each list identifying that a particular equalization module is less efficient than another equalization module.

In the embodiment where the power aware backchannel adaptation is performed in both transmitter 110 and receiver 130, control logic module 130 operates to direct the transmitter to reduce the de-emphasis setting by one step, because, from Table 1, de-emphasis module 112 provides the greatest opportunity for power savings in serial channel 100, and then the control logic module re-determines the set of compensation values for CTLE module 132, AGC module 134, and DFE module 136. If the resulting compensation values combine to yield a satisfactory BER, then control logic module 130 directs transmitter 110 to reduce the de-emphasis setting by another step and re-determines the set of compensation values for receiver 130. This process continues until adjustments within receiver 130 are unable to produce a satisfactory BER, at which point control logic module 138 directs transmitter 110 to increase the de-emphasis setting by one step.

At this point, in a particular embodiment, control logic module 138 resets the set of compensation values to the settings that produced last produced the satisfactory BER. In another embodiment, control logic module 138 operates to reduce either turn off DFE module 136, or to reduce the number of taps by one, because, from Table 1, DFE module 136 provides the next greatest opportunity for power savings in serial channel 100, and the control logic module re-determines the compensation values for CTLE module 132 and AGC module 134 based upon the reduced functioning of the DFE module, and the process continues as described above, to optimize the power consumed by the DFE module. In a particular embodiment, the equalization setting for CTLE module 132 is similarly optimized, because, from Table 1, CTLE module 132 provides the yet next greatest opportunity for power savings in serial channel 100. In another embodiment, the various power efficiencies of the compensation mechanisms of serial channel 100 vary with the operating data rate of the serial channel, as shown in the second and third columns of Table 1, where AGC module 134 is shown as being more efficient than CTLE module 132 at a 10 gigabit per second (Gb/s) data rate, but is shown as being less efficient than the CTLE module at a 20 Gb/s data rate. Here, control logic module 138 operates to consider the data rate in determining the order in which to optimize the power consumption. That is, when serial channel 100 is operating at 10 Gb/s, control logic module 138 will adjust the equalization setting of CTLE module 132 as the last optimization process, but when the serial channel is operating at 20 Gb/s, the control logic module will adjust the gain setting of AGC module 134 as the last optimization process.

Figure 2:
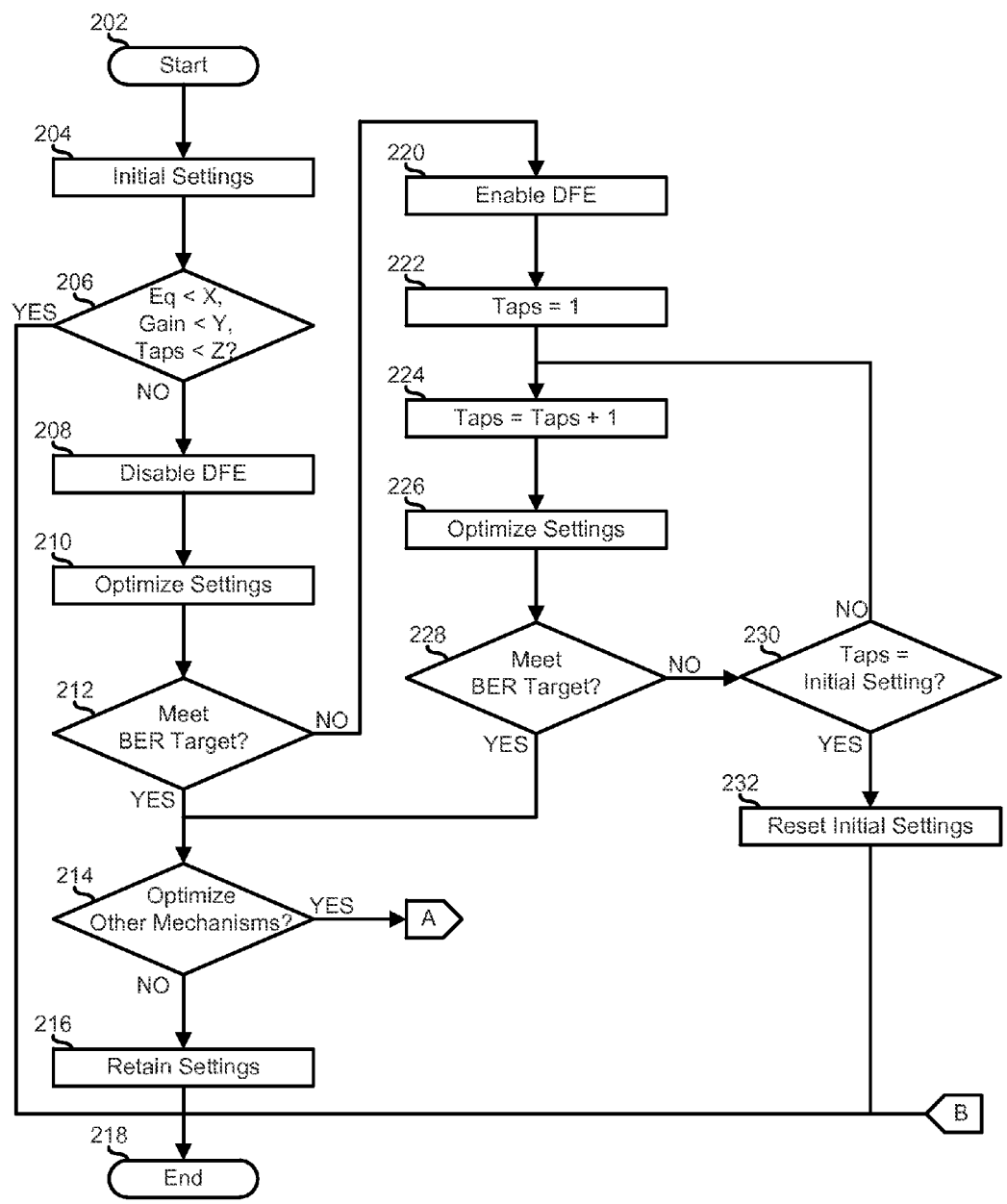
FIGS. 2 and 3 are flowcharts illustrating a method of power aware link adaptation in a high speed serial interface according to an embodiment of the present disclosure.
Figure 3:
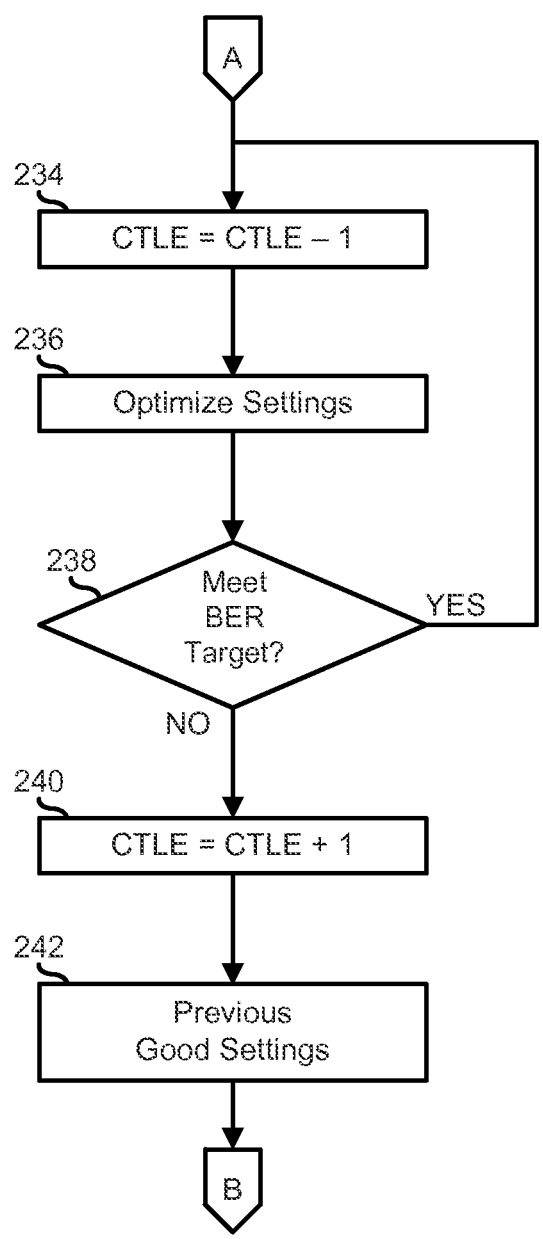

FIGS. 2 and 3 illustrate a method of power aware link adaptation in a high speed serial interface, starting at block 202. Initial compensation settings for a receiver are provided in block 204. For example, a best-best effort adaptation process can be utilized to provide link compensation settings in a transmitter and a receiver that are connected via a channel, or predetermined settings can be provided based upon a known configuration between the transmitter and the receiver. A determination is made as to whether or not various compensation settings for the various compensation mechanisms are less than predetermined threshold values in decision block 206. This decision is provided to make a determination as to whether or not additional power savings can be achieved through application of the method of power aware link adaptation. For example, where the compensation settings provided in block 204 are associated with low power settings of the various compensation mechanisms, there may be little need to perform additional link adaptation to achieve further power savings. An example of the decision may include a determination that the de-emphasis setting of de-emphasis module 112 is set to select a lower gain de-emphasis, such as less than 2 dB, that the equalization setting of CTLE module 132 is set to select a lower equalization, such as less than 10 dB, that the gain setting of AGC module 134 is set to select a lower gain, such as less than 10 dB, that the taps setting of DFE module 136 is set to select a low number of taps, such as less than 4 taps, or other determinations for other compensation mechanisms, as needed or desired. Here, the determination of decision block 206 can be based on a determination that one compensation setting is less than the predetermined threshold, that all of the compensation settings are less than the predetermined threshold, or another determination criteria, as needed or desired.

If the various compensation settings for the various compensation mechanisms are less than predetermined threshold values, the "YES" branch of decision block 206 is taken, the initial settings are retained and the method ends at block 218. If the one or more of the various compensation settings for the various compensation mechanisms are not less than predetermined threshold values, the "NO" branch of decision block 206 is taken, a DFE module is disabled in block 208, and the compensation settings of the compensation mechanisms other than the DEE module are optimized in block 210. For example, with DFE module 136 disabled, receiver 130 can optimize the settings for CTLE module 132 and for AGC module 134. A determination is made as to whether or not a target BER is being met by the optimized settings in decision block 212. For example, the optimized settings can be utilized in communications over the serial interface for a predetermined timeframe and the BER can be extracted from the data stream via various BER calculation methods as are known in the art. If the target BER is being met by the optimized settings, the "YES" branch of decision block 212 is taken and the method proceeds to decision block 214 as describe below. If not, the "NO" branch of decision block 212 is taken, the DFE module is re-enabled in block 220, and the taps setting is set to select at least one (1) tap in block 222. The number of selected taps is increased by one (1) tap in block 224, and the compensation settings of the compensation mechanisms other than the DEE module are re-optimized in block 226.

A determination is made as to whether or not a target BER is being met by the re-optimized settings in decision block 228. If so, the "YES" branch of decision block 228 is taken and the method proceeds to decision block 214 as describe below. If not, the "NO" branch of decision block 228 is taken and a decision is made as to whether or not the taps setting is equal to the initial taps setting in decision block 230. If so, the "YES" branch of decision block 230 is taken, the initial compensation settings are restored in block 232 and the method ends in block 218. In this case, it will have been demonstrated that no further power savings are achievable over the initial settings, because the number of selected taps is equal to the initial tap setting. If the taps setting is not equal to the initial taps setting, the "NO" branch of decision block 230 is taken, and the method returns to block 224 where the number of selected taps is increased by one (1).

If the target BER is being met by the optimized settings of block 210, as determined in decision block 212, or the target BER is being met by the optimized settings of block 226, as determined in decision block 228, the respective "YES" branch is taken and the method proceeds to decision block 214 where a decision is made as to whether or not additional compensation mechanisms are to be optimized. If not, the "YES" branch of decision block 214 is taken, the optimized compensation settings from either block 210 or block 226 are retained, and the method ends in block 218. If additional compensation mechanisms are to be optimized, the "YES" branch of decision block 214 is taken, and the equalization setting of a CTLE block is decreased by one (1) step in block 234, and the remaining compensation settings are re-optimized in block 236. A decision is made as to whether or not the target BER is being met by the re-optimized settings in decision block 238. If so, the "YES" branch of decision block 228 is taken and the method returns to block 234 where the equalization setting of the CTLE block is decreased by one (1). If the target BER is not being met by the re-optimized settings, the "NO" branch of decision block 238 is taken, the equalization setting of the CTLE block is increased by one (1), the previously optimized compensation settings are restored in block 242, and the method ends in block 218.

In a particular embodiment, a more stringent BER or an additional margin above a standard BER is applied to ensure that the trained link robustness exceeds the standard BER as specified in a system or industry standard design criteria. In this case, the methods of FIGS. 2 and 3 can be modified to ensure the additional margin is factored into the compensation setting decision states to achieve the specified robustness. In another embodiment, if the number of detected link, errors occurring during normal system operation exceed an expected BER or a BER with the additional margin, the system initiates link retraining to reduce or eliminate the link errors by applying a less aggressive power optimization to achieve higher overall eye margin. In another embodiment, the link retraining occurs on individual serial channels or across multiple channels in a high speed serial link.

The skilled artisan will recognize that the method of FIGS. 2 and 3, as described above, is exemplary. As such, one or more of the compensation mechanisms described can be omitted from the method, as needed or desired, or that other compensation mechanisms can be incorporated into the method, as needed or desired. Moreover, the order of adaptation of the compensation mechanisms is exemplary of the relative power efficiencies of the compensations mechanisms as described above and with reference to Table 1. As such, the skilled artisan will recognize that the applicability of the methods of the present disclosure can be adapted to account for other compensation mechanisms and other relative power efficiencies, as needed or desired. Further, where a transmitter and a receiver are able to communicate with each other, the methods as described herein can include power optimization of a transmitter de-emphasis module, in addition to the receiver compensation mechanisms as shown above.

Figure 4:
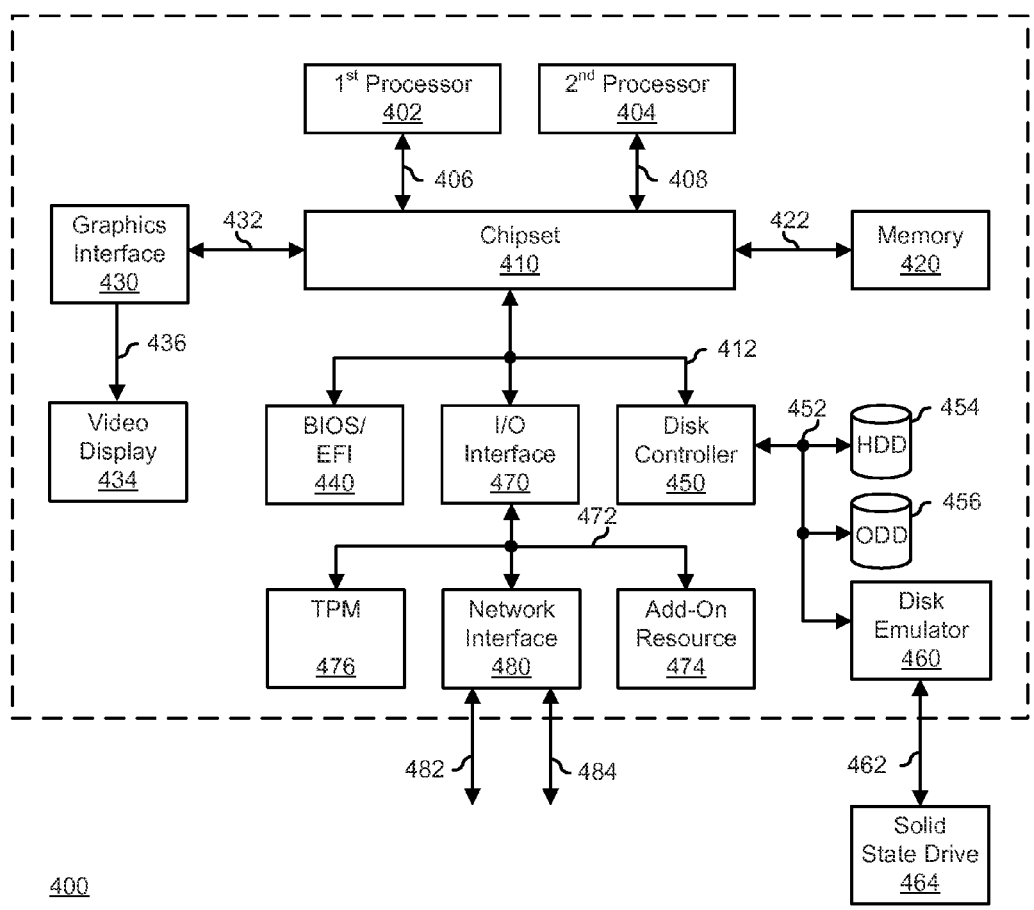
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver, comprising:
   a first equalization module adapted to provide a first compensation to a data signal received by the receiver;
   a second equalization module adapted to provide a second compensation to the data signal; and
   a control module including a first list that identifies the first equalization module as being less efficient than the second equalization module, the control module adapted to:
      provide a first compensation level of the first compensation and a second compensation level of the second compensation, such that the first compensation level and the second compensation level combine to operate on the data signal to meet a bit error rate (BER) target;
      set the level of the first compensation from the first compensation level to a third compensation level to reduce a power consumption of the receiver based on the first list identifying the first equalization module as being less efficient than the second equalization module; and
      determine whether, in response to an increase in the level of the second compensation from the second compensation level to a fourth compensation level, a combination of the third compensation level and the fourth compensation level operate on the data signal to meet the BER target.

2. The receiver of claim 1, wherein the control module is further adapted to:
   set the level of the second compensation from the second level to the fourth level when the third compensation level and the fourth compensation level combine to operate on the data signal to meet the BER target.

3. The receiver of claim 1, wherein the control module is further adapted to:
determine that the first compensation level is greater than a first threshold for the first compensation, wherein setting the level of the first compensation is in response to determining that the first compensation level is greater than a first threshold.

4. The receiver of claim 1, further comprising:
a third equalization module adapted to provide a third compensation to the data signal;
wherein the first list further identifies the second equalization module as being less efficient than the third equalization module, and the control module is further adapted to:
provide a fifth compensation level of the third compensation, such that the third compensation level, the fourth compensation level, and the fifth compensation combine to operate on the data signal to meet the BER target;
set the level of the second compensation from the fourth compensation level to a sixth compensation level to reduce a power consumption of the receiver based on the first list identifying the second equalization module as being less efficient than the third equalization module; and
determine whether, in response to an increase in the level of the third compensation from the fifth compensation level to a seventh compensation level, a combination of the third compensation level, the sixth compensation level, and the seventh compensation level operate on the data signal to meet the BER target.

5. The receiver of claim 4, wherein:
the first list is associated with a first data transfer rate of the data signal;
the control module includes a second list associated with a second data transfer rate of the data signal, the second list identifying the first equalization module as being less efficient than the second equalization module and the third equalization module as being less efficient than the second equalization module; and
the control module is further adapted to:
set the level of the third compensation from the fifth compensation level to a sixth compensation level to reduce a power consumption of the receiver based on the second list identifying the third equalization module as being less efficient than the second equalization module; and
determine whether, in response to an increase in the level of the second compensation from the fourth compensation level to a seventh compensation level, a combination of the third compensation level, the sixth compensation level, and the seventh compensation level operate on the data signal to meet the BER target.

6. The receiver of claim 1, further comprising:
a communication module coupled to a transmitter adapted to provide a third compensation to the data signal;
wherein the first list further identifies the second equalization module as being less efficient than the third equalization module, and the control module is further adapted to:
provide direct the communication module to set a fifth compensation level of the third compensation, such that the third compensation level, the fourth compensation level, and the fifth compensation combine to operate on the data signal to meet the BER target;
set the level of the second compensation from the fourth compensation level to a sixth compensation level to reduce a power consumption of the receiver based on the first list identifying the second equalization module as being less efficient than the third equalization module; and
determine whether, in response to an increase in the level of the third compensation from the fifth compensation level to a seventh compensation level, a combination of the third compensation level, the sixth compensation level, and the seventh compensation level operate on the data signal to meet the BER target.

7. The receiver of claim 1, wherein the first equalization module comprises a decision feedback equalization (DFE) module, and setting the level of the first compensation from the first compensation level to a third compensation level comprises turning off the DFE module.

8. A method, comprising:
providing, by a control module of a receiver, a first compensation level of a first compensation to a data signal received by the receiver, the first compensation being provided by a first equalization module of the receiver, and a second compensation level of a second compensation to the data signal, the second compensation being provided by a second equalization module of the receiver, such that the first compensation level and the second compensation level combine to operate on the data signal to meet a bit error rate (BER) target;
setting, by the control module, the level of the first compensation from the first compensation level to a third compensation level to reduce a power consumption of the receiver based on a first list identifying the first equalization module as being less efficient than the second equalization module; and
determining, by the control module, whether, in response to an increase in the level of the second compensation from the second compensation level to a fourth compensation level, a combination of the third compensation level and the fourth compensation level operate on the data signal to meet the BER target.

9. The method of claim 8, further comprising:
setting, by the control module, the level of the second compensation from the second level to the fourth level when the third compensation level and the fourth compensation level combine to operate on the data signal to meet the BER target.

10. The method of claim 8, further comprising:
determining, by the control module, that the first compensation level is greater than a first threshold for the first compensation, wherein setting the level of the first compensation is in response to determining that the first compensation level is greater than a first threshold.

11. The method of claim 8, further comprising:
providing, by the control module, a fifth compensation level of a third compensation to the data signal, the fifth compensation being provided by a third, such that the third compensation level, the fourth compensation level, and the fifth compensation combine to operate on the data signal to meet the BER target;
setting, by the control module, the level of the second compensation from the fourth compensation level to a sixth compensation level to reduce a power consumption of the receiver based on the first list identifying the second equalization module as being less efficient than the third equalization module; and determining, by the control module, whether, in response to an increase in the level of the third compensation from the fifth compensation level to a seventh compensation level, a combination of the third compensation level, the sixth compensation level, and the seventh compensation level operate on the data signal to meet the BER target.

12. The method of claim 11, wherein:
the first list is associated with a first data transfer rate of the data signal;
the control module includes a second list associated with a second data transfer rate of the data signal, the second list identifying the first equalization module as being less efficient than the second equalization module and the third equalization module as being less efficient than the second equalization module; and
the method further comprising:
  setting, by the control module, the level of the third compensation from the fifth compensation level to a sixth compensation level to reduce a power consumption of the receiver based on the second list identifying the third equalization module as being less efficient than the second equalization module; and
  determining, by the control module, whether, in response to an increase the level of the second compensation from the fourth compensation level to a seventh compensation level, a combination of the third compensation level, the sixth compensation level, and the seventh compensation level operate on the data signal to meet the BER target.

13. The method of claim 8, wherein:
the first list further identifies the second equalization module as being less efficient than a third equalization module of a transmitter coupled to the receiver; and
the method further comprises:
  directing, but the control module, the transmitter to set a fifth compensation level of the third compensation, such that the third compensation level, the fourth compensation level, and the fifth compensation combine to operate on the data signal to meet the BER target;
  setting, by the control module, the level of the second compensation from the fourth compensation level to a sixth compensation level to reduce a power consumption of the receiver based on the first list identifying the second equalization module as being less efficient than the third equalization module; and
  determining, by the control module, whether, in response to an increase in the level of the third compensation from the fifth compensation level to a seventh compensation level, a combination of the third compensation level, the sixth compensation level, and the seventh compensation level operate on the data signal to meet the BER target.

14. The method of claim 8, wherein:
the first equalization module comprises a decision feedback equalization (DFE) module; and
in setting the level of the first compensation from the first compensation level to a third compensation level, the method further comprises turning off the DFE module.

15. A non-transitory computer-readable medium including code for performing a method, the method comprising:
providing, by a control module of a receiver, a first compensation level of a first compensation to a data signal received by the receiver, the first compensation being provided by a first equalization module of the receiver, and a second compensation level of a second compensation to the data signal, the second compensation being provided by a second equalization module of the receiver, such that the first compensation level and the second compensation level combine to operate on the data signal to meet a bit error rate (BER) target;
setting, by the control module, the level of the first compensation from the first compensation level to a third compensation level to reduce a power consumption of the receiver based on a first list identifying the first equalization module as being less efficient than the second equalization module; and
determining, by the control module, whether, in response to an increase in the level of the second compensation from the second compensation level to a fourth compensation level, a combination of the third compensation level and the fourth compensation level operate on the data signal to meet the BER target.

16. The computer-readable medium of claim 15, the method further comprising:
setting, by the control module, the level of the second compensation from the second level to the fourth level when the third compensation level and the fourth compensation level combine to operate on the data signal to meet the BER target.

17. The computer-readable medium of claim 15, the method further comprising:
determining, by the control module, that the first compensation level is greater than a first threshold for the first compensation, wherein setting the level of the first compensation is in response to determining that the first compensation level is greater than a first threshold.

18. The computer-readable medium of claim 15, the method further comprising:
providing, by the control module, a fifth compensation level of a third compensation to the data signal, the fifth compensation being provided by a third, such that the third compensation level, the fourth compensation level, and the fifth compensation combine to operate on the data signal to meet the BER target;
setting, by the control module, the level of the second compensation from the fourth compensation level to a sixth compensation level to reduce a power consumption of the receiver based on the first list identifying the second equalization module as being less efficient than the third equalization module; and
determining, by the control module, whether, in response to an increase in the level of the third compensation from the fifth compensation level to a seventh compensation level, a combination of the third compensation level, the sixth compensation level, and the seventh compensation level operate on the data signal to meet the BER target.

19. The computer-readable medium of claim 18, wherein:
the first list is associated with a first data transfer rate of the data signal;
the control module includes a second list associated with a second data transfer rate of the data signal, the second list identifying the first equalization module as being less efficient than the second equalization module and the third equalization module as being less efficient than the second equalization module; and
the method further comprises:
  setting, by the control module, the level of the third compensation from the fifth compensation level to a sixth compensation level to reduce a power consumption of the receiver based on the second list identifying the third equalization module as being less efficient than the second equalization module; and determining, by the control module, whether, in response to an increase in the level of the second compensation from the fourth compensation level to a seventh compensation level, a combination of the third compensation level, the sixth compensation level, and the seventh compensation level operate on the data signal to meet the BER target.

20. The computer-readable medium of claim 15, wherein:
the first list further identifies the second equalization module as being less efficient than a third equalization module of a transmitter coupled to the receiver; and
the method further comprises:

directing, but the control module, the transmitter to set a fifth compensation level of the third compensation, such that the third compensation level, the fourth compensation level, and the fifth compensation combine to operate on the data signal to meet the BER target;

setting, by the control module, the level of the second compensation from the fourth compensation level to a sixth compensation level to reduce a power consumption of the receiver based on the first list identifying the second equalization module as being less efficient than the third equalization module; and determining, by the control module, whether, in response to an increase in the level of the third compensation from the fifth compensation level to a seventh compensation level, a combination of the third compensation level, the sixth compensation level, and the seventh compensation level operate on the data signal to meet the BER target.

* * * * *